(12) United States Patent
Mandan et al.

(10) Patent No.: US 12,226,756 B2
(45) Date of Patent: Feb. 18, 2025

(54) CATALYST SYSTEM AND METHOD FOR ITS PREPARATION

(71) Applicant: Reliance Industries Limited, Mumbai (IN)

(72) Inventors: Chidambaram Mandan, Tamilnadu (IN); Atish Kulkarni, Maharashtra (IN); Balachandran Vijai Shankar, Tamil (IN); Ramesh Bhujade, Maharashtra (IN); Ajit Sapre, Maharashtra (IN)

(73) Assignee: Reliance Industries Limited, Mumbai (IN)

(*) Notice: Subject to any disclaimer, the term of this patent is extended or adjusted under 35 U.S.C. 154(b) by 297 days.

(21) Appl. No.: 17/753,252

(22) PCT Filed: Aug. 25, 2020

(86) PCT No.: PCT/IB2020/057930
§ 371 (c)(1),
(2) Date: Feb. 25, 2022

(87) PCT Pub. No.: WO2021/038436
PCT Pub. Date: Mar. 4, 2021

(65) Prior Publication Data
US 2022/0339608 A1 Oct. 27, 2022

(30) Foreign Application Priority Data

Aug. 26, 2019 (IN) .............................. 201921034331

(51) Int. Cl.
*B01J 23/883* (2006.01)
*B01J 21/04* (2006.01)
(Continued)

(52) U.S. Cl.
CPC ............. *B01J 23/883* (2013.01); *B01J 21/04* (2013.01); *B01J 27/14* (2013.01); *B01J 35/50* (2024.01);
(Continued)

(58) Field of Classification Search
CPC . B01J 23/883; B01J 21/04; B01J 27/14; B01J 35/50; B01J 35/51; B01J 37/0203;
(Continued)

(56) References Cited

U.S. PATENT DOCUMENTS

2005/0266985 A1* 12/2005 Iwata ....................... B01J 35/30
502/208
2013/0008829 A1* 1/2013 Marchand .............. C10G 45/08
208/252

FOREIGN PATENT DOCUMENTS

| CN | 105435806 A | * | 3/2016 | |
| IN | 1651MUM2015 | | 10/2016 | |
| WO | WO-0008008 A1 | * | 2/2000 | ............ B01J 23/882 |

OTHER PUBLICATIONS

Machine translation of CN 105435806 A originally published Mar. 2016 to Chen et al. (Year: 2016).*

(Continued)

*Primary Examiner* — Colin W. Slifka
*Assistant Examiner* — Ritu S Shirali
(74) *Attorney, Agent, or Firm* — Osha Bergman Watanabe & Burton LLP

(57) ABSTRACT

The present disclosure relates to a catalyst system and a method for its preparation. The catalyst system of the present disclosure comprises a support, a promoter component impregnated in the support, and an active metal component comprising nickel, cobalt, and molybdenum impregnated in the support. In the active metal component the molar mass of molybdenum is greater than the combined (Continued)

molar mass of cobalt and nickel. The catalyst system of the present disclosure is used for upgrading crude bio oil.

12 Claims, 5 Drawing Sheets

(51) Int. Cl.
*B01J 27/14* (2006.01)
*B01J 35/50* (2024.01)
*B01J 35/51* (2024.01)
*B01J 37/02* (2006.01)
*B01J 37/08* (2006.01)
*B01J 37/18* (2006.01)
*B01J 37/20* (2006.01)
*C10G 45/08* (2006.01)

(52) U.S. Cl.
CPC .......... *B01J 35/51* (2024.01); *B01J 37/0203* (2013.01); *B01J 37/0205* (2013.01); *B01J 37/0207* (2013.01); *B01J 37/0236* (2013.01); *B01J 37/024* (2013.01); *B01J 37/08* (2013.01); *B01J 37/18* (2013.01); *B01J 37/20* (2013.01); *C10G 45/08* (2013.01); *C10G 2300/202* (2013.01); *C10G 2300/302* (2013.01); *C10G 2300/304* (2013.01); *C10G 2300/308* (2013.01)

(58) Field of Classification Search
CPC ................ B01J 37/0205; B01J 37/0207; B01J 37/0236; B01J 37/024; B01J 37/08; B01J 37/18; B01J 37/20; B01J 23/94; B01J 35/30; B01J 35/615; B01J 35/633; B01J 35/647; B01J 37/0201; B01J 37/28; B01J 38/02; C10G 45/08; C10G 2300/202; C10G 2300/302; C10G 2300/304; C10G 2300/308; Y02P 30/20
USPC ........................................................ 502/211
See application file for complete search history.

(56) References Cited

OTHER PUBLICATIONS

International Search Report in application No. PCT/IB2020/057930, mailed on Dec. 21, 2020 (3 pages).
Written Opinion issued in application No. PCT/IB2020/057930, mailed on Dec. 21, 2020 (5 pages).

* cited by examiner

Cumulative Percentage

CATALYST SYSTEM AND METHOD FOR ITS PREPARATION

FIELD

The present disclosure relates to a catalyst system and a method for its preparation.

Definitions

As used in the present disclosure, the following terms are generally intended to have the meaning as set forth below, except to the extent that the context in which they are used indicate otherwise.

Bio oil: The term "bio oil" refers to the product derived from biomass, such as, algae and which can be used as an alternative to petroleum fuel.

Crude bio-oil: The term "Crude bio oil", also referred to as CBO, is bio oil obtained from biomass, in crude form.

Upgraded bio oil: The term "Upgraded bio oil" refers to the bio oil obtained after refinement or treatment of crude bio oil, thereby altering its chemical and physical properties such that the upgraded bio oil has comparable properties to those of traditional fossil fuels. The process of converting crude bio oil into a useful energy source is also known as upgradation of crude bio oil.

Total acid number: The term "total acid number", also referred to as "TAN", is a measurement of acidity that is determined by the amount of potassium hydroxide in milligrams that is needed to neutralize the acids in one gram of oil.

BACKGROUND

The background information herein below relates to the present disclosure but is not necessarily prior art.

Fuel is generally obtained by refining crude oil. Due to the increasing demand for fuel, the reserves of crude oil are depleting. Therefore, there is a need to focus on alternative sources, like biomass, for obtaining fuel. Biomass, particularly algae, has a potential to become a viable feedstock due to its high oil content and environment-friendly nature. The bio oil obtained from biomass is in crude form known as 'Crude bio oil (CBO)' and it cannot be directly used as fuel. The crude bio oil undergoes a refinement or treatment process so as to alter its chemical and physical properties such that the bio oil has comparable properties to those of traditional fossil fuels. This process of converting crude bio oil into a useful energy source is known as upgradation of crude bio oil.

Various reagents and catalyst systems are known for upgradation of crude bio oil. However, these conventional catalysts provide upgraded bio oil with very low yield, and/or high acidity (TAN value). Further, the conventional processes for upgrading the bio oil generally require several reagents, and fluid media. The processes using conventional catalysts are cumbersome, involve multiple steps, and are energy and cost intensive.

The Indian patent application number 1651/MUM/2015 discloses a multi-metallic catalyst system comprising a bimetallic active metal component. The bimetallic catalyst system of 1651/MUM/2015 comprises at least one support, at least one promoter component impregnated in the support and an active metal component comprising two metals selected from the group consisting of Group IB, Group IIB, Group IV B, Group VB, Group VIB, Group VIIB, Group VIII and noble metals, uniformly dispersed on the support. However, the yield of the upgraded bio-oil obtained by using the bimetallic catalyst system is comparatively less.

Therefore, there is felt a need to provide an efficient catalyst system for preparing upgraded bio oil (UBO) from crude bio oil (CBO) with high yield.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a catalyst system.

Another object of the present disclosure is to provide a simple and cost-effective process for preparation of the catalyst system.

Still another object of the present disclosure is to provide a simple and cost-effective process for upgrading crude bio oil.

Other objects and advantages of the present disclosure will be more apparent from the following description, which is not intended to limit the scope of the present disclosure.

SUMMARY

The present disclosure provides a catalyst system comprising a support; a promoter component impregnated in the support; and an active metal component comprising nickel, cobalt, and molybdenum impregnated in the support, wherein in the active metal component, the molar mass of molybdenum is greater than the combined molar mass of cobalt and nickel.

Further, the present disclosure provides a process for preparing a catalyst system. The process comprises selecting at least one support, which is calcined to obtain a calcined support. A promoter component is impregnated in the calcined support to obtain a promoter impregnated alumina support. An active metal component is impregnated in the promoter impregnated alumina support to obtain a support impregnated with the promoter component and an active metal component. The active metal component is formed by mixing a nickel compound, a cobalt compound, a molybdenum compound, and a stabilizing agent in water, wherein the molar mass of molybdenum is greater than the combined molar mass of cobalt and nickel. The support impregnated with the promoter component and an active metal component is reduced to obtain the catalyst system. Optionally, the catalyst system is reduced and sulfided using at least one sulfiding agent selected from the group consisting of dimethyl disulfide and dimethyl sulfoxide.

Still further, the present disclosure provides a use of the catalyst system for hydrogenating crude bio oil (CBO) to obtain upgraded bio oil. The hydrogenation of crude bio oil is carried out in the presence of the catalyst system and hydrogen at a pressure in the range of 50 bar to 100 bar, at a temperature in the range of 350° C. to 500° C.; and for a time period in the range of 15 minutes to 120 minutes. The amount of the catalyst system is in the range of 5 to 15 weight % of the amount of the crude bio-oil. The yield of the upgraded bio oil obtained by the process of the present disclosure is in the range of 81% to 90%.

BRIEF DESCRIPTION OF THE ACCOMPANYING DRAWING

The present disclosure will now be described with the help of the accompanying drawing, in which:

FIGS. 1(a)-(c) illustrate scanning transmission electron microscope (STEM) images of a reduced catalyst system of the present disclosure;

FIGS. 2(a)-(c) illustrate STEM images of a sulfided catalyst system of the present disclosure;

DETAILED DESCRIPTION

Figure 1A:
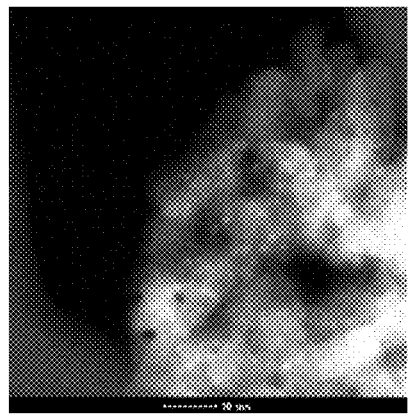

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Crude bio oil needs to be upgraded before its use as a fuel. Conventional catalysts used for upgradation of crude bio oil are associated with drawbacks such as low yield and high cost. Further, the processes using these conventional catalyst systems are cumbersome, use many reagents and fluid media, and are cost and energy intensive.

The present disclosure, therefore envisages a catalyst system for upgradation of crude bio oil that provides upgraded bio oil with comparatively high yield and an associated process that is simple and economical.

In one aspect, the present disclosure provides a catalyst system comprising a support; a promoter component impregnated in the support; and an active metal component comprising nickel, cobalt, and molybdenum impregnated in the support, wherein molar mass of molybdenum is greater than the combined molar mass of cobalt and nickel. The support is at least one selected from the group consisting of alumina, silica, zirconia, alumina-silica, zeolite, and molecular sieves. In an exemplary embodiment, the support is alumina.

In accordance with the present disclosure, the support is in a form selected from the group consisting of spheres, extrudates, powder, and pellets. In one embodiment, the support is in the form of extrudates.

The promoter component is at least one selected from the group consisting of Niobium (Nb), Phosphorous (P), Boron (B), Gallium (Ga), Germanium (Ge), Indium (In), Aurum (Au), and Tantalum (Ta). In an exemplary embodiment, the promoter component is phosphorous component such as phosphoric acid. The promoter, phosphoric acid forms cross linking with the hydroxyl functionalities of the alumina support to form aluminophosphates (Al—O—P) during impregnation. It remains as aluminophosphates during calcination. However, it becomes metal phosphides (Al—P and M—P) during reduction/activation of the catalyst.

Other promoter metals as disclosed in the present disclosure, act in a similar way like phosphorus, however, phosphorous demonstrated the best metal dispersion on the support and is most cost effective.

The amount of the promoter component is in the range of 0.1 to 2 weight % of the catalyst system, preferably in the range of 0.8 to 1 wt %. In an exemplary embodiment, the amount of phosphorous component is 1 weight % of the catalyst system.

The concentration of the promoter component plays an important role in the catalyst activity of the present disclosure. Reducing or increasing the aforestated amount/quantity/concentration of the promoter metal would result in lowering the catalyst activity, as the promoter is critical for metal dispersion onto the support during the synthesis of the catalyst system of the present disclosure.

The amount of an active metal component is in the range of 0.05 to 15 weight % of the catalyst system, preferably in the range of 8 to 12 weight %. In accordance with an exemplary embodiment of the present disclosure, the amount of the active metal component is 10 weight % of the catalyst system.

The concentration of the active metal component plays an important role in the catalyst activity of the present disclosure. Reducing the aforestated amount/quantity/concentration of the active metal component would result in lowering the catalyst activity, as the active metal component will not completely and efficiently load on the alumina support during the synthesis of the catalyst system of the present disclosure. Further, increasing the aforestated amount/quantity/concentration of the active metal component would result in higher metal loading on the alumina support, which may not lead to a very stable catalyst system of the present disclosure.

In accordance with an exemplary embodiment of the present disclosure, the catalyst system comprises alumina support; a promoter component containing phosphorous impregnated in the alumina in an amount of 1 wt %; and an active metal component comprising nickel, cobalt, and molybdenum impregnated in the phosphorous impregnated alumina in an amount of 10 wt %, wherein the mole ratio of nickel:cobalt:molybdenum is 1:1:3.

The mole ratio of nickel:cobalt:molybdenum of 1:1:3 is optimized for obtaining a high yield of the product.

The catalyst system of the present disclosure provides a comparatively higher yield of the upgraded bio oil, preferably more than 85%, and reduced TAN value of upgraded bio-oil, preferable 0.17 mg KOH/g as compared to the bimetallic catalyst system as disclosed in 1651/MUM/2015.

The catalyst system of the present disclosure is capable of providing upgraded bio oil with reduced acidity (TAN of upgraded bio oil as low as 0.17 mg KOH/ g), while the bimetallic catalyst system disclosed in 1651/MUM/2015 provides upgraded bio oil with comparatively high acidity (TAN of upgraded bio oil is in the range of 1.7 to 2.7 mg KOH/ g).

The inventors of the present disclosure surprisingly found that the TAN values of the upgraded bio oil obtained using the catalyst system of the present disclosure are comparable to the TAN of the petroleum fuel. Therefore, the catalyst system of the present disclosure is capable of providing much cleaner bio oil as compared to the bio oil obtained by the bimetallic catalyst system.

In second aspect, the present disclosure provides a process for preparing a catalyst system. The process is described in detail as given below:

At least one support is selected and is calcined to obtain a calcined support. The support is selected from the group consisting of alumina, silica, zirconia, alumina-silica, zeolite, and molecular sieves. In an exemplary embodiment, the support is alumina.

The calcination of alumina is carried out at the temperature in the range of 500° C. to 700° C. for a time period in the range of 1 hour to 10 hours. In an exemplary embodiment, the calcination of alumina is done at 600° C. for 6 hours.

In the next step, a promoter component is impregnated in the calcined support. In accordance with the present disclosure, the calcined support is contacted with a first mixture comprising a source of the promoter component and water under stirring at a temperature in the range of 40° C. to 100° C. for a time period in the range of 1 hour to 12 hours to obtain a first resultant mixture. The first resultant mixture is cooled, followed by filtering the cooled first resultant mixture to obtain a first residue. The so obtained first residue is dried at a temperature in the range of 20° C. to 150° C., followed by calcining to obtain a promoter component impregnated support.

In the further step, an active metal component is impregnated on the promoter impregnated support to obtain a promoter impregnated and active metal component impregnated support. The active metal component comprises nickel, cobalt, and molybdenum, wherein molar mass of molybdenum is greater than the combined molar mass of cobalt and nickel. In one embodiment, the active metal component is formed by mixing a nickel compound, a cobalt compound, a molybdenum compound, and a stabilizing agent in water, wherein molar mass of molybdenum is greater than the combined molar mass of cobalt and nickel. In one embodiment, the promoter component impregnated support is further impregnated with an active metal component by contacting the promoter component impregnated support with a second mixture comprising a compound of nickel, a compound of cobalt, a compound of molybdenum, water and a stabilizing agent, while stirring at a temperature in the range of 50° C. to 100° C. for a time period in the range of 1 hour to 10 hours to obtain a second resultant mixture. The second resultant mixture is cooled, followed by filtering the cooled second resultant mixture to obtain a second residue. The so obtained second residue is dried at a temperature in the range of 20° C. to 150° C., followed by calcining to obtain a support impregnated with the promoter component and the active metal component.

In one embodiment, the active metal component impregnated support comprises nickel (Ni), cobalt (Co) and molybdenum (Mo), in the form of their oxides.

The so obtained support impregnated with the promoter component and the active metal component is reduced under hydrogen pressure at a predetermined temperature and pressure to obtain the catalyst system.

The process of the present disclosure can further include the step of sulfiding the catalyst system using at least one sulfiding agent selected from the group consisting of dimethyl disulfide and dimethyl sulfoxide, preferably dimethyl sulfide. In one embodiment the support impregnated with the promoter component and the active metal component undergoes sulphidation to obtain sulfided catalyst.

In the sulfided catalyst of the present disclosure, sulphur links to the metals (Co/Ni/Mo) in the catalyst. The activation of the catalyst is usually carried out in one step using a sulphidation reagent and hydrogen/nitrogen. During sulphidation, Metal oxides in the catalyst are converted to metal sulphide form in slabs; NiCoMo—S is the activated state of the catalyst. The reduction of the Metal sulphide in the presence of hydrogen during the hydrotreatment releases the $H_2S$. The vacant site on the metal then attracts the heteroatom components to get reduced further.

In another embodiment the support impregnated with the promoter component and the active metal component undergoes reduction followed by sulphidation to obtain reduced and sulfided catalyst. The reduction and sulphidation is sequential procedure followed where the reduction takes place at 500° C. then cooled to 400° C. and then sulphidation is performed. Temperature is reduced by auto-cooling of the catalyst reduction unit.

The precursor of nickel is at least one selected from the group consisting of nickel nitrate, nickel acetate, nickel chloride, preferably nickel nitrate.

The precursor of cobalt is at least one selected from the group consisting of cobalt nitrate, cobalt acetate, cobalt chloride, preferably cobalt nitrate.

The precursor of molybdenum is at least one selected from the group consisting of ammonium molybdate, sodium molybdate, potassium molybdate, preferably ammonium molybdate.

The stabilizing agent is at least one selected from the group consisting of hexamethyleneimine, ammonia solution, piperidine, pyrrolidine, morpholine, piperazine hydrate, 2-methylcyclohexyl amine, and cyclohexylamine, preferably hexamethyleneimine.

The step of calcination is carried out at a temperature in the range of 500 to 700° C.

In third aspect, the present disclosure provides a use of the catalyst system for hydrogenating the crude bio-oil (CBO) to obtain upgraded bio oil (UBO).

In accordance with the present disclosure, the hydrogenation of the crude bio-oil is carried out in the presence of the catalyst system and hydrogen at a pressure in the range of 50 bar to 100 bar, preferably 80 bar, at a temperature is in the range of 350° C. to 500° C.; for a time period is in the range of 15 minutes to 120 minutes. The amount of the catalyst system used in the hydrogenation of the crude bio-oil is in the range of 5 to 15 weight % of the amount of the crude bio-oil.

The yield of the upgraded bio oil obtained by the process of the present disclosure is in the range of 81% to 90%.

In accordance with the present disclosure, the catalyst system is regenerated by calcining at a temperature in the range of 400° C. to 600° C. for a time period in the range of 1 hour to 24 hours, preferably for a time period in the range of 1 hour to 10 hours. The regenerated catalyst system is reused for at least 5 times for upgrading the crude bio-oil.

The catalyst system of the present disclosure is effective in improving/increasing the yield of the upgraded bio-oil (more than 84%) and at the same time decreasing the total acid number of the upgraded bio-oil (up to 0.17 mg KOH/g) The process of the present disclosure does not need additional reagents or fluid media. Therefore, the process is simple and economical. Further, the catalyst system is reused for at least 5 times, and hence, the process is environment friendly.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: Preparation of the Catalyst System

Step I:
50 g of alumina extrudate was calcined at 600° C. for 6 hours to obtain calcined alumina.

Step II:
A reaction vessel was charged with 1 weight % of phosphoric acid in 200 mL deionized water and stirred using a rotary evaporator at 60° C. to obtain first mixture. After 10 minutes, 50 g of the calcined alumina (obtained in step I) was added to the vessel and the rotation was continued at 60° C. for 2 hours to obtain a first resultant mixture. The first resultant mixture was cooled and filtered to obtain a first residue. The first residue was dried at 25 □C, and further dried at 120° C. overnight to obtain the dried extrudates. The dried extrudates were calcined at 600° C. for 6 hours to obtain a phosphorous component impregnated alumina extrudate.

Step III:
Separately, another vessel was charged with 6 weight % of ammonium molybdate (39.04 gm) in 150 mL of deionized water and 20 mL of hexamethyleneimine to obtain a mixture. The mixture was stirred at 60° C., till complete dissolution of ammonium molybdate. The mixture was cooled to 40° C. and Cobalt (II) nitrate hexahydrate solution (4.99 gm, 2 weight % in 50 mL water) and nickel nitrate solution (5.06 gm, 2 weight % in 50 mL water) were added to the mixture to obtain a second mixture. Phosphorous component impregnated alumina (obtained in step II) was added to the mixture simultaneously and was stirred at 60° C. for 2 hours on a rotary evaporator to obtain a second resultant mixture.

The second resultant mixture was cooled and filtered to obtain a second residue. The second residue was washed with water, dried at 25° C. for 2 hours, and then further dried at 120° C. overnight to obtain a metal loaded alumina catalyst. The catalyst was calcined at 600° C. for 6 hours in air to obtain a support impregnated with phosphorous component and active metal component containing nickel, cobalt, and molybdenum. The molar ratio of Ni:Co:Mo was 1.1:3.

Step IV:

Reduced Catalyst System

The support impregnated with the phosphorous component and the active metal component (nickel, cobalt and molybdenum) was reduced at 500° C. using hydrogen at a flow rate of 25 mL/minute for 4 hours to obtain the catalyst system (reduced catalyst system) of the present disclosure.

Sulfided Catalyst System

The sulfided catalyst system was obtained by sulfiding the support impregnated with phosphorous component and active metal component (containing nickel, cobalt, and molybdenum) using dimethyl disulfide in the presence of nitrogen gas.

7.43 g of dimethyl disulfide was injected in 10-15 equal installments at 400° C. in a flow of $N_2$ at the rate of 10 ml/min to obtain the catalyst system (sulfided catalyst system) of the present disclosure.

Sulfided and Reduced Catalyst System

The support impregnated with the phosphorous component and the active metal component (nickel, cobalt and molybdenum) was reduced at 500° C. using hydrogen at a flow rate of 25 mL/minute for 4 hours to obtain the catalyst system (reduced catalyst system) of the present disclosure.

During the step of sulphidation, the temperature was lowered from 500° C. to 40° C. at a rate of 10° C./minute and $H_2$ pressure was maintained at 3 bar. 7.43 g of dimethyl disulfide was injected in 10-15 equal installments and the temperature was lowered to 50° C. at the rate of 10° C./min to obtain the catalyst system (sulfided and reduced catalyst system) of the present disclosure.

Characterization of the Catalyst System

The catalyst system synthesized in experiment-1 was characterized and the properties are illustrated in Table 1.

TABLE 1

| | Catalyst Properties | | | | | | |
|---|---|---|---|---|---|---|---|
| | Analysis | | | | | | |
| | ICP - OES | Crushing Strength | BET surface area | Pore Volume | Pore Diameter | Micropore Volume | Nanoparticle Size |
| Unit | — | daN | $m^2/g$ | cc/g | Å | cc/g | Å |
| Expt-1 (a support impregnated with phosphorous | Al, Co, Ni, | 1.21 | 184.7 | 0.48 | 117.9 | 0.007 | 324.84 |

TABLE 1-continued

Catalyst Properties

| | Analysis | | | | | | |
|---|---|---|---|---|---|---|---|
| | ICP-OES | Crushing Strength | BET surface area | Pore Volume | Pore Diameter | Micropore Volume | Nanoparticle Size |
| component and active metal component containing nickel, cobalt and molybdenum) | Mo, P | | | | | | |

* BET surface area- Brunauer-Emmett-Teller (BET) isotherm surface area,
daN—decanewton The catalyst system obtained in experiment 1 was characterized by ICP-OES (Inductively Coupled Plasma-Optical Emission Spectrometry). The ICP-OES spectrum showed the presence of Al, Co, Ni, Mo and P.

Figure 1B:
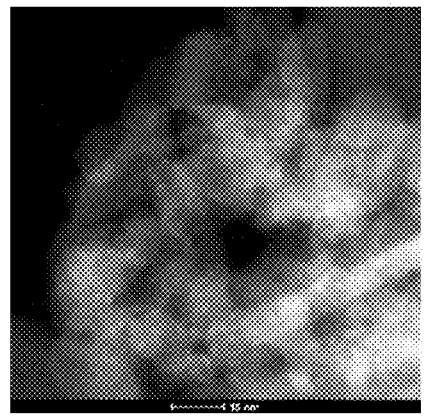
Figure 1C:
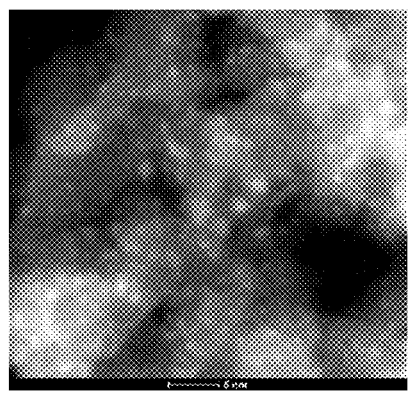
Figure 2A:
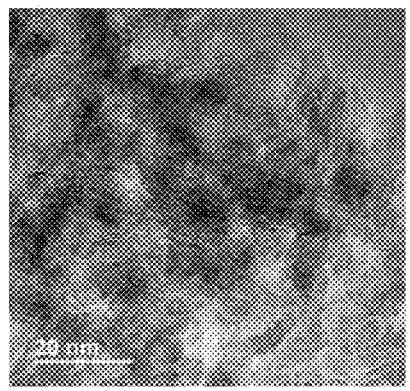
Figure 2B:
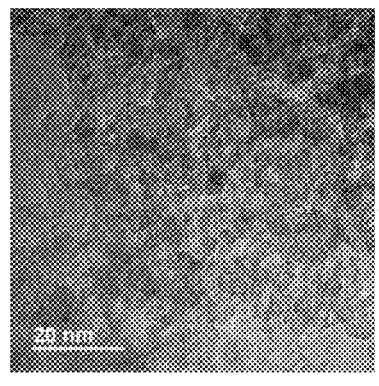
Figure 2C:
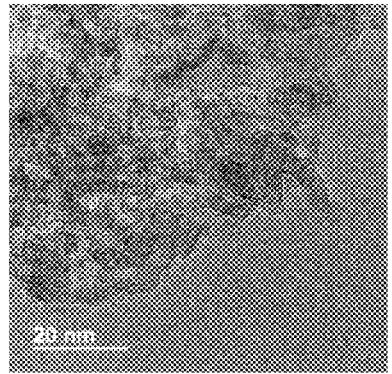

The STEM (Scanning Transmission Electron Microscopy) characterization was performed to evaluate the homogeneity and size distribution of the metals in the catalyst system. FIGS. 1(a) to 1(c) shows STEM images of the catalyst system, including a uniform distribution of the active metals across the support. FIGS. 2(a) to 2(c) show STEM images of the sulfided catalyst system, wherein (circled) layered slabs are spread uniformly across the support.

Experiment 2: Upgradation of Crude Bio-Oil Using the Catalyst System of the Present Disclosure The chemical and physical properties of the crude bio oil (CBO) used in the present disclosure are provided in Table-2.

TABLE 2

Characteristics of the CBO

| | Unit of measurement (UoM) | CBO |
|---|---|---|
| Chemical Properties | | |
| Carbon | % | 81.83 |
| Hydrogen | | 10.42 |
| Nitrogen | | 4.85 |
| Sulphur | | 0.24 |
| Oxygen | | 2.66 |
| Ash | | 0.545 |
| Moisture | | 5.21 |
| HHV | MJ/kg | 42.21 |
| TAN | mg KOH/g Oil | 35.811 |
| Physical Properties | | |
| Kinematic Viscosity at 40° C. | cSt | 1128.10 |
| Dynamic Viscosity at 40° C. | cP | 1105.99 |
| Density at 40° C. | g/cc | 0.98 |
| Pour Point | ° C. | >45 |
| Freezing Point | | <−100 |
| Flash Point | | 134.5 |

The sulfided catalyst system obtained in step IV of experiment 1 of the present disclosure was used for the upgradation of CBO.

The upgradation of CBO was carried out using the following procedure.

The crude bio oil (120 gm) was hydrogenated in a reactor in the presence of the sulfided catalyst system obtained in experiment 1 (12 gm) at 420° C. for 30 minutes to obtain the upgraded bio oil. During hydrogenation, a hydrogen pressure of 80 bar was maintained in the reactor. The yield of UBO was 84%. The chemical properties of CBO and UBO are summarized in Table-3.

TABLE 3

Chemical properties of the upgraded bio oil obtained using the sulfided catalyst system of the present disclosure

| Parameter | | CBO | Upgraded bio oil (UBO) |
|---|---|---|---|
| Yield | | | 84% |
| C | % | 81.0 | 82.87 |
| H | | 10.70 | 11.24 |
| N | | 5.78 | 5.35 |
| S | | 0.42 | 0.40 |
| O | | 2.09 | 0.14 |
| Higher heating value (HHV) | MJ/kg | 42.45 | 44.21 |
| Ash | % | 0.50 | 0.05 |
| Moisture | | 5.37 | 1.08 |
| TAN | mg KOH/g oil | 53.24 | 0.17 |

* HHV = $0.3377 \times C + 1.442 \times (H - O/8) + 0.092 \times S$

It is evident from Table-3 that the carbon content and hydrogen content of upgraded bio oil (UBO) is higher than that of crude bio oil (CBO), thereby resulting in an increase in HHV value to 44.21 from 42.45. Further, the upgraded bio oil (UBO) has reduced oxygen content, moisture content, reduced TAN value and reduced ash value as compared to crude bio oil (CBO).

In addition to the improvement in chemical characteristics, the physical properties of the crude bio oil had improved after upgradation using the sulfided catalyst system of the present disclosure.

The results are summarized in Table-4.

TABLE 4

Physical properties of the upgraded bio oil obtained using the sulfided catalyst system of the present disclosure

| At 40° C. | Unit of measurement (UoM) | CBO | UBO |
|---|---|---|---|
| Kinematic Viscosity | cSt | 1128.10 | 7.85 |
| Dynamic Viscosity | cP | 1105.99 | 6.91 |
| Density | g/cc | 0.98 | 0.88 |

It is evident from Table-4 that the viscosity and density of the crude bio oil has decreased after upgradation using the sulfided catalyst system of the present disclosure.

Figure 3A:
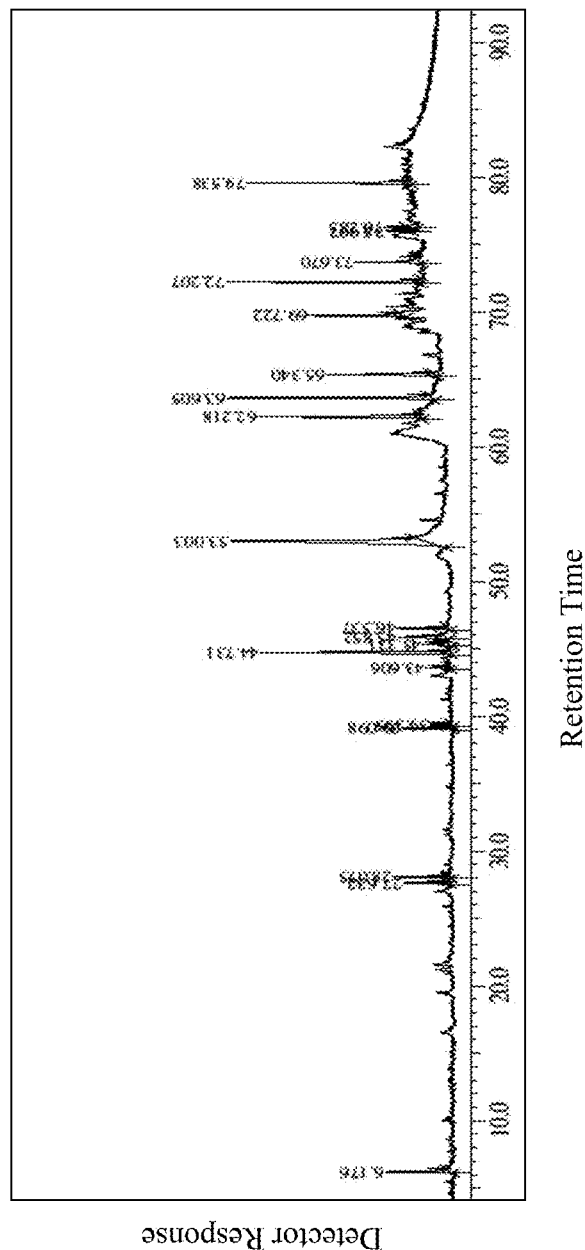
FIG. 3(a) illustrates gas chromatogram (GC) of crude bio oil (CBO)
Figure 3B:
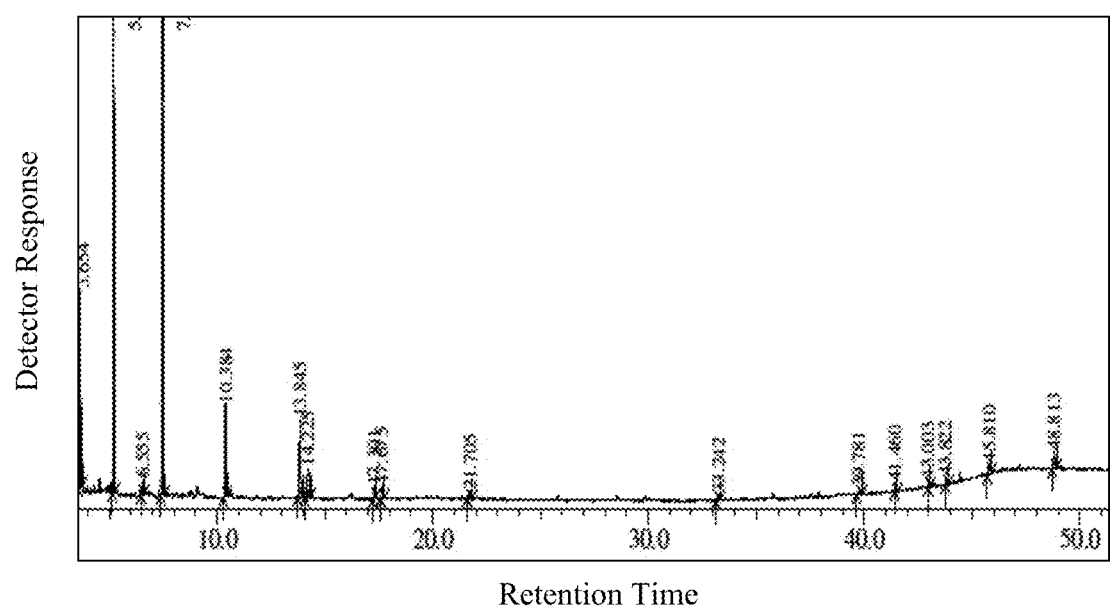
FIG. 3(b) illustrates gas chromatogram of the upgraded bio oil (UBO) prepared using a reduced catalyst system of the present disclosure.
Figure 4:
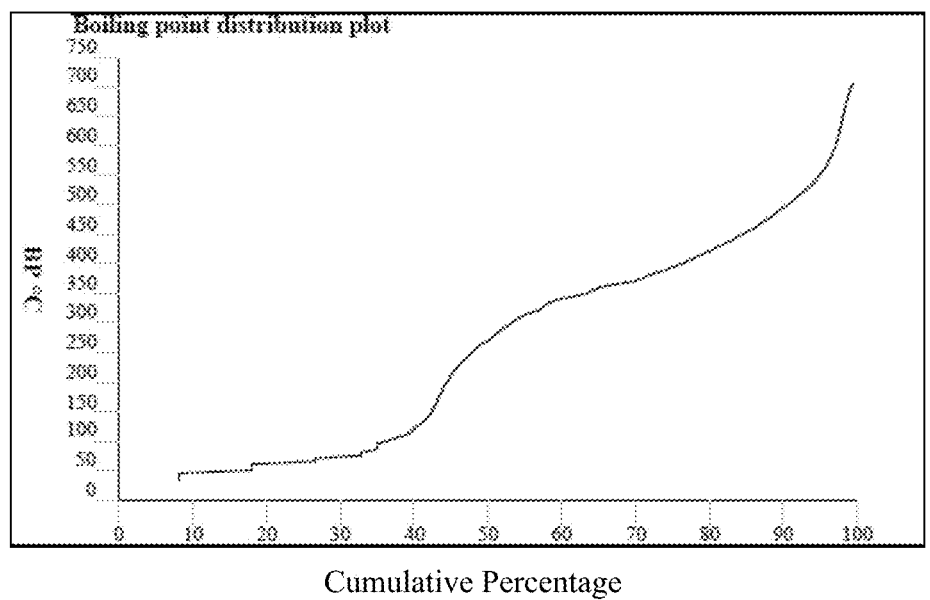
FIG. 4 illustrates simulated distillation (SIMDIST) analysis for crude bio oil (CBO).

FIG. 3(a) shows a gas chromatogram (GC) of crude bio oil (CBO), whereas FIG. 3(b) shows gas chromatogram (GC) of upgraded bio oil (UBO). A comparison of FIGS. 3(a) and 3(b) shows that the amount of saturated hydrocarbons has increased in upgraded bio oil (UBO).

Experiments 3: Effect of the Varying Amounts Of Co, Mo and Ni on the Reduced Catalyst System In order to study the effect of the molar ratio of Co, Mo and Ni on the upgradation of crude bio oil, two catalyst systems of the present disclosure were prepared using the process described in Experiment 1 with varying amounts of Co, Mo and Ni.

These reduced catalyst systems were used for the upgradation of crude bio oil using the process described in Experiment 2. The results are summarized in Table 5.

TABLE 5

Yield of the upgraded bio oil obtained using the catalyst system containing varying amounts of metals

| Experiment no. | Composition | Ratio of metals (Ni:Co:Mo ratio) | Yield |
|---|---|---|---|
| 2 | $Ni_2Co_2Mo_6$ | 1:1:3 | 87 |
| 3 | $Ni_2Co_6Mo_2$ | 1:3:1 | 68 |
| 4 | $Ni_6Co_2Mo_2$ | 3:1:1 | 62 |

It is evident from Table-5 that the yield of the upgraded bio oil depends upon the composition of the catalyst system.

It is observed that high yield of UBO is obtained with the Ni:Co:Mo ratio of 1:1:3 as compared to the other ratios of the metals used in the catalyst system.

COMPARATIVE EXAMPLES

Experiment 4: Comparison of a Catalyst System with an Active Metal Component Consisting of Two Metals (Bimetallic Catalyst System as Disclosed in Indian Application No. 1651/MUM/2015) and the Catalyst System of the Present Disclosure The bimetallic catalyst systems were prepared using a procedure as disclosed in Indian Application No. 1651/MUM/2015. Two bimetallic catalyst systems with active metal component consisting of two metals, i.e. Co and Mo in the ratio of 1:4, and Ni and Mo in the ratio of 1:4, were prepared for comparative analysis.

These bimetallic catalyst systems were used for the upgradation of crude bio oil using the process described in Experiment 2. The results are summarized in Table 6.

TABLE 6

Yield of the upgraded bio oil obtained using the bimetallic catalyst system and the reduced catalyst system of the present disclosure

| Experiment no. | Composition | Ratio of metals | Yield |
|---|---|---|---|
| 2 | $Ni_2Co_2Mo_6$ | 1:1:3 | 87 |
| 5 | $Co_2Mo_8$ | 1:4 | 72 |
| 6 | $Ni_2Mo_8$ | 1:4 | 65 |

It is evident from Table-6 that the yield of the upgraded bio oil using the bimetallic catalyst system (as disclosed in the Indian Application No. 1651/MUM/2015) is lower than the yield using the catalyst system (reduced catalyst system) of the present disclosure having Ni:Co:Mo in the ratio of 1:1:3.

Experiment 5: Comparison of UBO Obtained Using the Sulfided Catalyst System, Reduced Catalyst System, and the Reduced and Sulphided Catalyst System Upgradation of CBO was carried out using three catalyst systems, viz. the sulphided catalyst system (used in experiment 2), the reduced catalyst system and the reduced-sulphided catalyst system, using the process described in Experiment 2. The results are summarized in Table 7.

TABLE 7

Properties of the upgraded bio oil obtained using the catalyst system

| Content | | CBO | Sulfided catalyst system (Experiment 1) | Reduced catalyst system (Experiment 1) | Reduced and sulphided catalyst system (Experiment 1) |
|---|---|---|---|---|---|
| Yield | % | — | 84 | 87 | 86 |
| C | % | 81.0 | 82.87 | 83.7 | 83.15 |
| H | | 10.70 | 11.24 | 10.78 | 11.43 |
| N | | 5.78 | 5.35 | 4.21 | 4.44 |
| S | | 0.42 | 0.40 | 0.43 | 0.08 |
| O | | 2.09 | 0.14 | 0.88 | 0.89 |
| HHV | MJ/kg | 42.45 | 44.21 | 43.70 | 44.42 |
| Ash | % | 0.50 | 0.05 | 0.07 | 0.05 |
| Moisture | | 5.37 | 1.08 | 2.02 | 2.05 |
| TAN | mg KOH/g oil | 53.24 | 0.17 | 1.68 | 0.98 |

It is evident from Table-7 that the reduced catalyst system and the reduced and sulfided catalyst system of the present disclosure provided upgraded bio oil (UBO) having a higher HHV value and TAN value as compared with the sulfided catalyst system. Further, the reduced and sulfided catalyst system of the present disclosure provided upgraded bio oil (UBO) with higher yield as compared with the reduced catalyst system and the sulfided catalyst system.

Experiment 6: Comparison of UBO Obtained Using the Reduced and Sulfided Catalyst System of the Present Disclosure, and the Reduced and Sulfided Bimetallic Catalyst System (as Disclosed in the Indian Application No. 1651/MUM/2015)

A reduced and sulfided catalyst system of the present disclosure was prepared using the procedure described in Experiment 1. The reduced and sulfided bimetallic catalyst system was prepared using the procedure as disclosed in Indian Application No. 1651/MUM/2015.

These catalyst systems were used for upgradation of crude bio oil using the process described in Experiment 2. The results are summarized in Table 8.

TABLE 8

Yield of the upgraded bio oil obtained using the reduced and sulfided bimetallic catalyst system and the reduced and sulfided catalyst system of the present disclosure

| Content | | CBO | Reduced and sulfided catalyst system of the present disclosure | Comparative Example - Reduced and sulfided bimetallic catalyst system as disclosed in the Indian Application No. 1651/MUM/2015 |
|---|---|---|---|---|
| Yield | % | — | 86 | 83 |
| C | % | 81.0 | 83.15 | 84.16 |
| H | | 10.70 | 11.43 | 10.81 |
| N | | 5.78 | 4.44 | 4.33 |
| S | | 0.42 | 0.08 | 0.19 |
| O | | 2.09 | 0.89 | 0.51 |
| HHV | MJ/kg | 42.45 | 44.42 | 43.94 |
| Ash | % | 0.50 | 0.05 | 0.03 |
| Moisture | | 5.37 | 2.05 | 1.56 |
| TAN | mg KOH/g oil | 53.24 | 0.98 | 2.71 |

It is evident from Table-8 that the reduced and sulfided catalyst system of the present disclosure provided upgraded bio oil (UBO) with higher yield as compared to the reduced and sulfided bimetallic catalyst system.

Further, the reduced and sulfided catalyst system of the present disclosure provided upgraded bio oil (UBO) having reduced sulphur content and TAN value as compared to the reduced and sulfided bimetallic catalyst system.

Experiment 7: Comparison of UBO Obtained Using the Reduced Catalyst System of the Present Disclosure and the Reduced Bimetallic Catalyst System Not Containing Promoter A reduced bimetallic catalyst system without promoter was prepared and it was used, for upgradation of crude bio oil using the process described in Experiment 2. The results are summarized in Table 9.

TABLE 9

Yield of the upgraded bio oil obtained using the reduced catalyst system of the present disclosure with a reduced bimetallic catalyst system without promoter

| | | CBO | Reduced system containing phosphorous (Expt 1) | Reduced bimetallic system not containing phosphorous (as promoter) |
|---|---|---|---|---|
| Yield | % | — | 87 | 72 |
| C | % | 81.0 | 83.7 | 83.33 |
| H | | 10.70 | 10.78 | 11.46 |
| N | | 5.78 | 4.21 | 4.75 |
| S | | 0.42 | 0.43 | 0.06 |
| O | | 2.09 | 0.88 | 0.40 |
| HHV | MJ/kg | 42.45 | 43.70 | 44.60 |
| Ash | % | 0.50 | 0.07 | 0.09 |
| Moisture | | 5.37 | 2.02 | 2.33 |
| TAN | mg KOH/g oil | 53.24 | 1.68 | 1.6 |

It is evident from Table-9 that the reduced catalyst system of the present disclosure provided upgraded bio oil (UBO) with higher yield as compared to the bimetallic catalyst system without promoter component.

Experiment 8: Comparison of UBO Obtained Using a Reduced Catalyst System of the Present Disclosure and a Reduced Commercial Catalyst System Commercial catalyst comprising nickel, cobalt, molybdenum on alumina support having molar ratio of nickel, cobalt, molybdenum was procured from Refining R&D and was reduced. The commercial catalyst and the catalyst of the present disclosure was used for upgradation of crude bio oil using the process described in Experiment 2. The results are summarized in Table 10.

TABLE 10

Comparison of UBO obtained using a reduced catalyst system of the present disclosure and the reduced commercial catalyst system

| | | CBO | Reduced catalyst system of the present disclosure | Reduced commercial catalyst system |
|---|---|---|---|---|
| Yield | % | — | 87 | 87 |
| C | % | 81.0 | 83.7 | 83.08 |
| H | | 10.70 | 10.78 | 11.44 |
| N | | 5.78 | 4.21 | 4.44 |
| S | | 0.42 | 0.43 | 0.08 |
| O | | 2.09 | 0.88 | 0.96 |
| HHV | MJ/kg | 42.45 | 43.70 | 44.39 |
| Ash | % | 0.50 | 0.07 | 0.13 |
| Moisture | | 5.37 | 2.02 | 1.52 |
| TAN | mg KOH/g oil | 53.24 | 1.68 | 1.11 |

It is evident from Table 10 that the reduced catalyst system of the present disclosure demonstrates similar yield compared to the reduced commercial catalyst. Additionally, the reduction in oxygen, nitrogen, and ash content is higher in the upgraded bio-oil obtained by using the catalyst system of the present disclosure, which will contribute to an improved quality of fuel.

Experiment 9: Comparison of UBO Obtained Using a Sulfided Catalyst System of the Present Disclosure and the Sulfided Commercial Catalyst System Commercial catalyst comprising nickel, cobalt, Molybdenum on alumina support having a molar ratio of nickel, cobalt, molybdenum was procured from Refining R&D and it was reduced. The sulfided commercial catalyst system was used, for upgradation of crude bio oil using the process described in Experiment 2. The results are summarized in Table 11.

Commercial catalyst was sulphided in conditions similar to sulphidation of multimetallic catalyst of the present disclosure as given in Experiment 1. Sulphidation is carried out at 400° C., for 4 hr in flow of $N_2$ 10 ml/min and 7.43 g of dimethyl disulfide was injected in 10-15 equal installments.

TABLE 11

Yield of the upgraded bio oil obtained using sulfided catalyst system of the present disclosure with a sulfided commercial catalyst

|  |  | Sulfided catalyst (Expt. 2) | Sulfided commercial catalyst |
|---|---|---|---|
| Yield | % | 84 | 79 |
| C | % | 82.87 | 83.07 |
| H |  | 11.24 | 11.12 |
| N |  | 5.35 | 5.07 |
| S |  | 0.40 | 0.18 |
| O |  | 0.14 | 0.56 |
| HHV | MJ/kg | 44.21 | 44.01 |
| Ash | % | 0.05 | 0.11 |
| Moisture |  | 1.08 | 1.03 |
| TAN | mg KOH/g oil | 0.17 | 1.98 |

It is evident from Table-11 that the sulfided catalyst system of the present disclosure provided upgraded bio oil (UBO) with high yield as compared to the sulfided commercial catalyst. Further the reduction in oxygen content and TAN value is higher in the case of the catalyst system of the present disclosure.

Experiment 10: Regeneration of Catalyst

The spent catalyst system was calcined at 600 □C for 6 hours, followed by cooling to room temperature to obtain a regenerated catalyst.

The catalyst can be regenerated and reused for up to five times for the upgradation of CBO.

TECHNICAL ADVANCEMENTS

The present disclosure described herein above has several technical advantages including, but not limited to, the realization of:

a simple catalyst system for upgradation of crude bio oil; and an economic process for upgradation of CBO.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A catalyst system comprising:
   an alumina support;
   a promoter component containing phosphorous in an amount of 1 wt % impregnated in the alumina support; and
   an active metal component comprising nickel, cobalt, and molybdenum impregnated in the alumina support in an amount of 10 wt %;
   wherein a molar mass of molybdenum is greater than the combined molar mass of cobalt and nickel, wherein a mole ratio of nickel:cobalt:molybdenum is 1:1:3,
   wherein the promoter component is chemically bonded to the alumina support in the form of aluminum phosphide, and
   wherein the promoter component is chemically bonded to the active metal component in the form of metal phosphides.

2. The catalyst system as claimed in claim 1, wherein the alumina support is in a form selected from the group consisting of spheres, extruders, powder, and pellets.

3. The catalyst system as claimed in claim 1, wherein the catalyst system is used for hydrogenating crude bio-oil to obtain upgraded bio-oil.

4. The catalyst system as claimed in claim 3, wherein the hydrogenation is carried out in the presence of hydrogen at a pressure in the range of 50 bar to 100 bar, at a temperature in the range of 350° C. to 500° C. and for a time period in the range of 15 minutes to 120 minutes, and wherein the hydrogenation includes a step of regenerating the catalyst system by calcining at a temperature in the range of 400° C. to 600° C. for a time period in the range of 1 hour to 24 hours.

5. The catalyst system as claimed in claim 3, wherein the yield of the upgraded bio-oil is in the range of 81% to 90%.

6. The catalyst system as claimed in claim 3, wherein the amount of the catalyst system is in the range of 5 to 15 weight % of the amount of the crude bio-oil.

7. The catalyst system as claimed in claim 4, wherein the regenerated catalyst system is reused at least 5 times for upgrading crude bio oil.

8. A process for preparing the catalyst system as claimed in claim 1, the process comprising the following steps:
 i. selecting the alumina support and calcining the alumina support to obtain a calcined alumina support, wherein calcining the alumina support is carried out at a temperature in the range of 500° C. to 700° C. for a time period in the range of 6 hours to 12 hours;
 ii. performing first impregnation on the calcined alumina support with the promoter component to obtain an alumina support impregnated with the promoter component;
 iii. forming a mixture of an active metal component comprising a nickel compound, a cobalt compound, a molybdenum compound and a stabilizing agent in a water, wherein molar mass of molybdenum is greater than the combined molar mass of cobalt and nickel;
 iv. performing second impregnation on the alumina support impregnated with the promoter component with the mixture comprising an active metal component to obtain an alumina support impregnated with both the promoter component and the active metal component; and
 v. reducing the alumina support impregnated with both the promoter component and the active metal component to obtain the catalyst system, and optionally including the step of sulfiding the catalyst system using at least one sulfiding agent selected from dimethyl disulfide and dimethyl sulfoxide.

9. The process as claimed in claim 8, wherein the first impregnation in step (ii) comprises the following steps:
 contacting the calcined alumina support with a solution containing the promoter component and water under stirring at a temperature in the range of 40° C. to 100° C. for a time period in the range of 1 hour to 12 hours to obtain a first resultant mixture,
 cooling the first resultant mixture, followed by filtering the cooled first resultant mixture to obtain a first residue, and
 drying the first residue at a temperature in the range of 20° C. to 150° C. followed by calcining to obtain the alumina support impregnated with the promoter component.

10. The process as claimed in claim 8, wherein the second impregnation in step (iv) comprises the following steps:
 contacting the alumina support impregnated with the promoter component with the mixture comprising the active metal component under stirring at a temperature in the range of 50° C. to 100° C. for a time period in the range of 1 hour to 10 hours to obtain a second resultant mixture,
 cooling the second resultant mixture, followed by filtering the cooled second resultant mixture to obtain a second residue, and
 drying the second residue at a temperature in the range of 20° C. to 150° C., followed by calcining to obtain the alumina support impregnated with both the promoter component and the active metal component.

11. The process as claimed in claim 8, wherein the stabilizing agent is at least one selected from the group consisting of hexamethyleneimine, ammonia solution, piperidine, pyrrolidine, morpholine, piperazine hydrate, 2-methylcyclohexyl amine and cyclohexylamine.

12. The process as claimed in claim 11, wherein the stabilizing agent is hexamethyleneimine.

* * * * *

UNITED STATES PATENT AND TRADEMARK OFFICE
CERTIFICATE OF CORRECTION

| | | |
|---|---|---|
| PATENT NO. | : 12,226,756 B2 | Page 1 of 1 |
| APPLICATION NO. | : 17/753252 | |
| DATED | : February 18, 2025 | |
| INVENTOR(S) | : Chidambaram Mandan et al. | |

It is certified that error appears in the above-identified patent and that said Letters Patent is hereby corrected as shown below:

On the Title Page

At item (72) Inventors, Line number 4, the city name "Tamil" should read --Tamilnadu--

Signed and Sealed this
Sixteenth Day of September, 2025

Coke Morgan Stewart
*Acting Director of the United States Patent and Trademark Office*